United States Patent Office 3,335,324
Patented Aug. 8, 1967

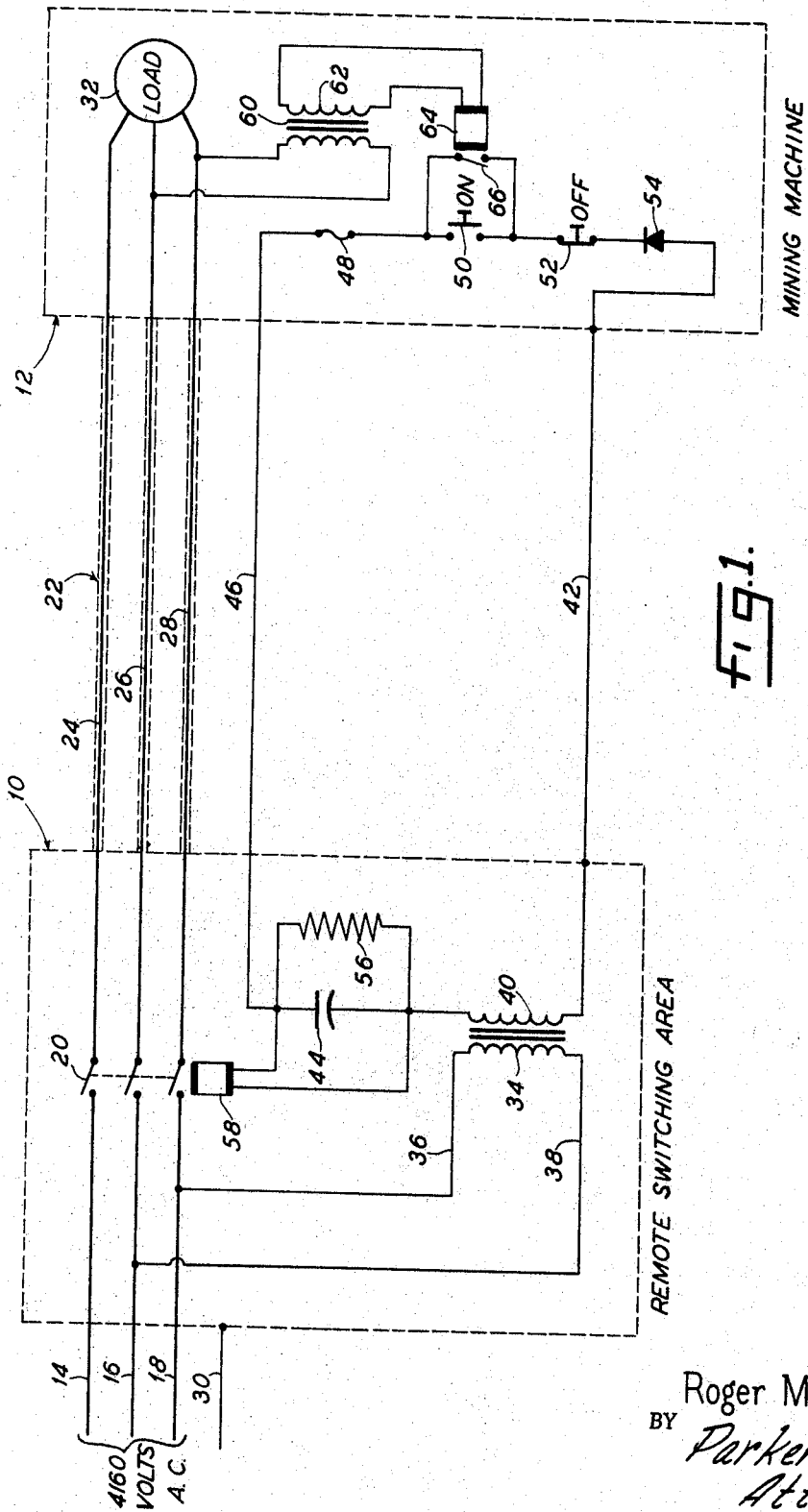

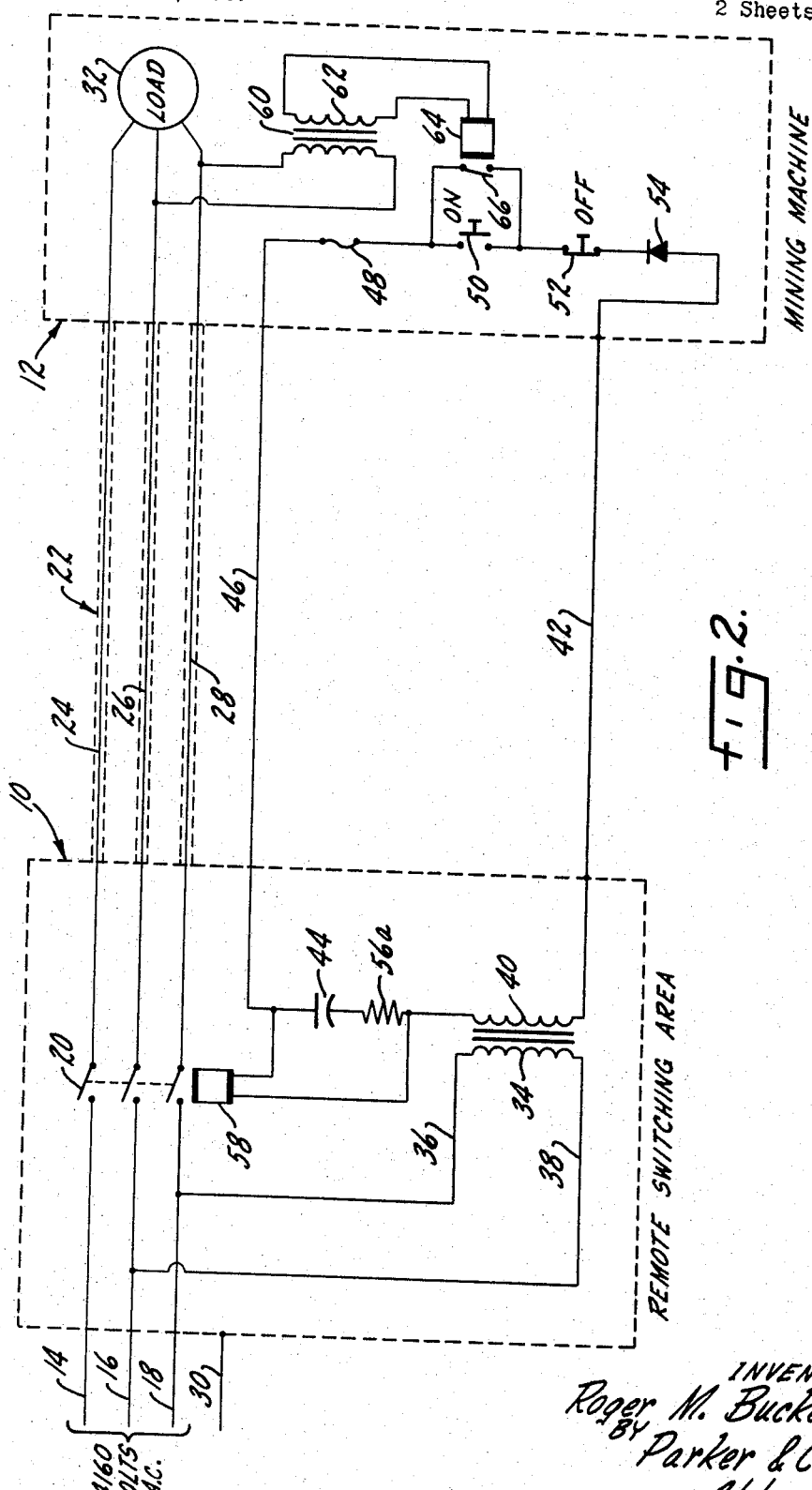

3,335,324
FAIL-SAFE CONTINUOUS GROUND MONITORING CIRCUIT
Roger M. Buckeridge, Downers Grove, Ill., assignor to Westinghouse Air Brake Company, Pittsburgh, Pa., a corporation of Pennsylvania
Filed Oct. 6, 1965, Ser. No. 493,331
15 Claims. (Cl. 317—18)

ABSTRACT OF THE DISCLOSURE

This invention relates to a fail-safe continuous ground monitoring circuit formed by ground and check wires extending between a remote switching area and a point of use. The monitoring circuit is a part of a power supply system extending between the remote switching area and the point of use. At the switching area there are contacts controlling the power system as well as means for supplying low voltage alternating current to the monitoring circuit. At the point of use there are means for converting the alternating current signal on the monitoring circuit to a direct current signal which is used to hold the power contacts in a closed position. By separating the means for generating the direct current signal and the means which utilize the direct current signal, the monitoring circuit will detect either a short or an open in the ground or check wires.

---

This invention relates to a fail-safe continuous ground monitoring circuit and is a continuation-in-part of copending application Ser. No. 463,170, filed June 11, 1965 now abandoned.

This invention relates broadly to a fail-safe ground monitoring circuit having ground and check wires extending between a remote switching area and a point of use, especially useful in monitoring the ground wire of a high voltage mining machine working at a distance from a main power contactor. The circuit automatically de-energizes the electrical power system at the contactor any time there is a short between the ground and check wires or an open condition in either.

The crux of the present invention, which is applicable in a wide variety of forms in addition to those specifically disclosed herein, is that the main contactor, located at the remote switching area, is operable to closed condition in response to a different kind of signal applied to the circuit at the remote switching area.

One purpose of the invention is a monitoring circuit of the type described which operates at a minimal voltage and extends between a remote switching area and a point of use, with any break in the ground circuit immediately opening the high voltage system.

Another purpose is a fail-safe ground monitoring circuit of the type described in which the low voltage power for operating the ground monitoring circuit is taken from the high voltage system.

Another purpose is a monitoring circuit of the type described utilizing a charged capacitor for maintaining a relay controlling the high voltage system in a closed position.

Another purpose is a monitoring circuit of the type described including a source of AC power at the remote switching area, a rectifier at the point of use in series with said source and a capacitor in series with said rectifier, with the capacitor being utilized to pass AC voltage but block DC current and to furnish a charge to hold the high voltage system in an operating condition.

Another purpose is a reliably operable monitoring circuit of the type described which utilizes a minimum of components and may be manufactured at a minimum cost.

Other purposes will appear in the ensuing specification, drawings and claims.

The invention is illustrated diagrammatically in the following drawings wherein:

FIGURE 1 is a circuit diagram of one form of the invention, and

FIGURE 2 is a circuit diagram illustrating a modified form of the invention.

The invention will be described in connection with an underground mining operation, although obviously the invention has substantially wider application. Conventionally an underground electrically operated mining machine receives its power from a power source with a trailing cable connecting the mining machine to the power source. The higher the voltage, the more efficient the transfer and utilization of power and the more efficient the mining operation. Conventionally, much underground mining machinery is operated at 440 volts, but due to the large cross section of the 440 volt cable, and its relative inefficiency in great lengths, it is limited to 500 feet or so, and never beyond 1000 feet for high horsepower machines.

In the present invention the 5-wire trailing cable includes three main power conductors and two auxiliary conductors, the latter being a ground wire and a ground check wire. For safety, it is essential that the integrity of the ground wire circuit be maintained at all times. If there is a break in the ground wire or the check wire, or if there is a short between them, the main power contactor at the remote switching area must open instantly and automatically and remain open until the trouble is found and repaired.

The present invention is concerned with an improved control system for maintaining the integrity of that ground wire circuit.

It should be realized that the invention is not limited to any particular voltage, but is satisfactorily used on any distribution system in which it is necessary to maintain a continuous ground wire.

As above stated it is absolutely essential that there be a secure ground for the mining machine. The mere fact that the mining machine may be operating from a point on the earth or is in contact with the earth floor is not sufficient. There must be a physical ground connection, for example to the neutral point of a three-phase system. Accordingly, it is the present practice in underground mining operations to include an extra pair of conductors in the normal three-phase power distribution system, one conductor being a ground wire, and the other being a check wire, the ground wire being physically connected to an adequate metallic grounding system, metallic stakes driven deep in the ground, or piping, railroad rails, etc., and the neutral point of a three-phase system as above-mentioned.

As illustrated herein, the remote switching area may be designated generally at 10 and the point of use for the power or the mining machine may be designated generally at 12. Wires 14, 16 and 18 bring the high voltage power to the remote switching area 10 and a set of contacts 20 control the flow of the three-phase power out over a cable leading to the point of use 12. Contacts 20 are normally biased to an open position. The cable may be indicated generally at 22 and may include lines 24, 26, 28, 42 and 46. The neutral wire of the three-phase distribution system may be indicated at 30 and it may be connected to the area 10 so that the potential of the structure at the switching area is at ground potential or effective ground, namely the same as the neutral on the three-phase system. The high voltage system may be completed by a load 32 such as a motor on a mobile mining machine which is at the point of use, the load being connected to lines 24, 26 and 28.

A step-down transformer 34 may be connected by lines 36 and 38 to any two of the high voltage distribution lines, or in the alternative, the transformer 34 may be connected between any one line and the neutral point. The secondary of transformer 34, indicated at 40, may be connected on one side to ground wire 42 which is also connected to the switching area structure so that the ground wire is effectively at ground potential. The other side of the secondary 40 is connected through a capacitor 44 to check wire 46, with both the check wire 46 and the ground wire 42 being within the main cable and running to the point of use 12. At the point of use there may be a fuse 48, an "on" switch 50, an "off" switch 52, and a rectifier means 54, all in series between wires 46 and 42. Optionally, with the proper circuitry, a full wave rectifier may be employed. The means 54 may comprise a half wave rectifier consistent with the energization requirements of coil 58. The ground monitoring circuit may be completed by a resistor 56, in parallel with capacitor 44. Relay 58 is actutable by the DC current output of the rectifier means 54 to maintain the contacts 20 closed responsive to that DC current and to allow the contacts to open when that DC current is cut off, either by an open in either one of lines 42, 46, or a short therebetween. Relay 58 also is of a type to act as a filter, blocking the passage of AC current at the voltages permitted by the fuse 48 so that AC currents induced into the secondary 40 are ineffective to hold the relay 58 closed. For purposes of illustrating the invention, coil 58 has been shown in a position to control the operation of contacts 20. However, in actual operation coil 58 itself may not operate the contacts, as physically such contacts are quite large. In normal operation there may be additional circuitry between coil 58 and contacts 20, with the operation of coil 20 controlling such additional circuitry such that the coil effectively operates contacts 20.

At the point of use there may be a transformer 60, connected between any two of the high voltage lines, and having its secondary 62 connected to a coil 64 operating a switch 66. Switch 66 is in parallel with "on" switch 50 such that once "on" switch 50 is closed, the circuit will remain in a closed condition because of the operation of switch 66.

The step-down transformer 34 may reduce the voltage from line voltage, for example 4160 volts or 440 volts, to a minimum level voltage, for example 12 volts AC or 24 volts AC. The voltage at the secondary is sufficiently low not to be dangerous, but yet is of a value which will actually form an operating circuit between the point of use and the remote switching area.

FIGURE 2 illustrates a modified form of the invention in which capacitor 44 has been placed in series with a resistor 56a. Otherwise the circuits of FIGURES 1 and 2 are identical. By placing resistor 56a in series with capacitor 44, the discharge path of the capacitor is altered from that shown in FIGURE 1. The main advantage of this series arrangement is protection of the capacitor 44 in case of a fault condition which would pass overvoltages AC current through it. Capacitor 44 will preferably be of the electrolytic type.

The use, operation and function of the invention are as follows:

Assuming that the operator at the mining machine wishes to start the machine, he closes "on" switch 50, which completes the ground monitoring circuit. The low voltage alternating voltage signal produced at the secondary 40 will oscillate back and forth through the ground and check wires and the capacitor 44. That signal will have no effect on the relay coil 58 which acts as a filter, blocking AC signals. The low voltage signal will be rectified to provide pulsating (half wave) DC current in the ground monitoring circuit. This will energize the relay coil 58 and the capacitor 44 will effectively smooth out the DC current into the relay coil 58 to supply a substantially continuous DC current to the coil 58. The latter may be designed to operate on pure half wave pulsating DC, in which case a minimum size capacitor 44 may be employed. It is preferred, however, to use a capacitor 44 of sufficient size to supply a substantially continuous DC current to the relay as long as the rectifier 54 is generating a DC current in response to the varying voltage signal from the secondary 40. Contacts 20 will be held closed as long as the rectifier 54 produces the DC current and as long as a residual, holding charge exists in the capacitor 44 (this residual effect will be relatively short). As long as the main power contacts 20 are held closed, power will be fed through them to the motor 32 through the main cable circuit 22. Coil 64 will hold switch 66 closed.

If there is any type of fault on the ground wire or the chcek wire, for example an open, capacitor 44 will immediately discharge through bleeder resistor 56. As the voltage on the capacitor drops to zero, coil 58 will no longer be energized and contacts 20 will drop out. This will immediately open the power system through cable 22 to the mining machine. Even if the open is immediately corrected, or is intermittent in nature, the system cannot be started unless "on" switch 50 is again operated. And, preferably, for safety the operator should be required to reclose the contacts 20 after finding and correcting the fault.

Much the same operation results when there is a short between the ground wire and the check wire. The short would cause an immediate discharge of capacitor 44 with the result that coil 58 would again release contacts 20 to an open position.

In the circuit of FIGURE 1 capacitor 44 discharges through the parallel combination of resistor 56 and coil 58. In the circuit of FIGURE 2 coil 58 and resistor 56a are effectively in series, hence providing a somewhat different discharge path for the capacitor. Both circuits work satisfactorily, however, the discharge path shown in FIGURE 2 is preferred as it provides additional protection for coil 58 to insure that it will not receive a damaging surge of current. Overall the circuits of FIGURES 1 and 2 operate in an identical manner.

Of importance in the invention is the fact that the ground monitoring circuit operates at a low voltage, which is safe, but which permits positive release of the contacts operating the high voltage system in the case of a fault on the monitoring circuit.

It should be realized that although the invention has been described in connection with underground mining operations and utilizing a voltage of 4160 volts, the invention has substantially wider application and can be utilized at any voltage and on any type of application.

Whereas the preferred form of the invention has been shown and described herein, it should be realized that there are many modifications, substitutions and alterations thereto within the scope of the following claims.

What is claimed is:

1. In a fail-safe ground monitoring circuit including ground and check conductors extending between a remote switching area and a point of use;

contactor means, in said circuit, at the remote switching area, actuatable to a holding condition in response to one signal in said circuit;

means, at the remote switching area, for applying a different signal to said circuit; and means, at the point of use, for generating said one signal in said circuit in response to said different signal for actuating said contactor means to its holding condition.

2. In a fail-safe ground monitoring circuit including ground and check conductors extending between a remote switching area and a point of use;
- contactor means, in said circuit, at the remote switching area, actuatable to a holding condition in response to direct current in said circuit;
- means, at the remote switching area, for applying a varying voltage signal to said circuit; and
- means, at the point of use, for generating a direct current in said circuit in response to said varying voltage signal for actuating said contactor means to its holding condition.

3. In a fail-safe ground monitoring circuit having ground and check wires extending between a remote switching area and a point of use;
- a normally open contactor at said remote switching area;
- an electrical actuator energizable by direct current to hold said contactor closed;
- means for applying an alternating voltage signal to said circuit at the remote switching area; and
- means at the point of use for generating a direct current in said circuit in response to said alternating voltage signal for energizing said actuator to hold said contactor closed.

4. In a fail-safe ground monitoring circuit having ground and check wires between a remote switching area and a point of use;
- a normally open contactor at said remote switching area;
- means biasing said contactor toward normally open condition;
- an electrical actuator operable by direct current to hold said contactor closed;
- means for applying an alternating voltage signal to said circuit at the remote switching area;
- means for rendering said electrical actuator inoperable by said alternating voltage signal;
- and means at the point of use for generating a direct current in said circuit in response to said alternating voltage signal for energizing said actuator to hold said contactor closed;
- whereby said contactor is maintained closed as long as said direct current is transmitted through said circuit to said actuator; and
- whereby further said contactor is opened by said biasing means when the transmission of said direct current to said actuator is interrupted.

5. In a fail-safe ground monitoring circuit for use with a high voltage system supplying AC power from a remote switching area to a point of use, a ground monitoring circuit between said switching area and said point of use, means, at the switching area, connected to said AC power and to said monitoring circuit for supplying power to said monitoring circuit, control contacts in said power system at said switching area and means, in said monitoring circuit and at said switching area, for actuating said control contacts, means, in said monitoring circuit, and at said point of use, for utilizing the power in said monitoring circuit to provide operating current for said actuating means, a fault in said monitoring circuit interrupting said operating current and causing the release of said control contacts.

6. In a fail-safe ground monitoring circuit for use with a high voltage system supplying AC power from a remote switching area to a point of use, a ground monitoring circuit between said switching area and said point of use, means, at the switching area, connected to said AC power and to said monitoring circuit for supplying AC power to the monitoring circuit at a substantially lower voltage than that supplied to the point of use, control contacts in said power system at the switching area and a coil in said monitoring circuit for causing operation of said contacts, a charging element in said monitoring circuit at said switching area and connected in combination with said coil to hold said contacts in a closed position as long as said element remains charged, and means in said monitoring circuit at said point of use effecting the charge of said charging element, a fault in said monitoring circuit permitting the discharge of said charging element and the consequent release of said control contacts to open the power system between said switching area and the point of use.

7. The circuit of claim 6 further characterized in that said charging element is a capacitor, and a resistor in parallel with said capacitor.

8. The circuit of claim 6 further characterized in that said charging element is a capacitor, and a resistor in series with said capacitor.

9. The circuit of claim 6 further characterized in that said coil is in parallel with said charging element.

10. The circuit of claim 6 further characterized in that said point of use in a portable machine.

11. The circuit of claim 6 further characterized in that the means in said circuit effecting the charge of said charging element includes a rectifier.

12. In a fail-safe ground monitoring circuit for use with a high voltage system supplying AC power from a switching area to a point of use, a ground monitoring circuit between said switching area and point of use, a step-down transformer at the switching area connected to said AC power and said monitoring circuit to supply AC power to the monitoring circuit at a substantially lower voltage than that supplied to the point of use, contacts in said power system and a coil in said monitoring circuit for causing operation of said contacts, the opening of said contacts opening the power system between said switching area and the point of use, a capacitor in said monitoring circuit at the switching area and connected to said coil, a rectifier in said monitoring circuit at the point of use for charging said capacitor, and a resistor in circuit with said capacitor, and coil, the charge on said capacitor operating said coil to hold said contacts in a closed position, a fault in the monitoring circuit causing the capacitor to discharge through said resistor and permit said coil to release said contacts to an open position.

13. The circuit of claim 12 further characterized by and including a start switch in said monitoring circuit.

14. The circuit of claim 13 further characterized in that said start switch is at said point of use, and means, operated from the power system, for holding said start switch in a closed position, once it has been closed.

15. The circuit of claim 12 further characterized in that said resistor is in series with said coil and resistor.

References Cited

UNITED STATES PATENTS

| | | | |
|---|---|---|---|
| 2,554,598 | 5/1951 | Storch | 317—18 |
| 2,922,925 | 1/1960 | Gerrard | 317—18 X |

FOREIGN PATENTS

| | | |
|---|---|---|
| 538,296 | 6/1955 | Belgium. |

MILTON O. HIRSHFIELD, *Primary Examiner.*

J. D. TRAMMELL, *Assistant Examiner.*

UNITED STATES PATENT OFFICE
CERTIFICATE OF CORRECTION

Patent No. 3,335,324                                  August 8, 1967

Roger M. Buckeridge

It is certified that error appears in the above identified patent and that said Letters Patent are hereby corrected as shown below:

Column 6, line 56, "resistor", second occurrence, should read -- capacitor --.

Signed and sealed this 19th day of August 1969.

(SEAL)
Attest:

Edward M. Fletcher, Jr.                             WILLIAM E. SCHUYLER, JR.
Attesting Officer                                         Commissioner of Patents